Figure 1:
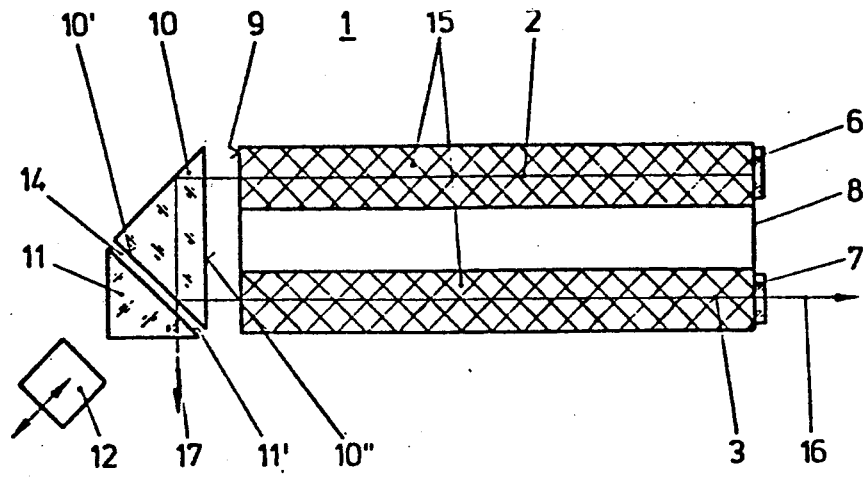

United States Patent [19]

Karning et al.

[11] Patent Number: 4,468,778
[45] Date of Patent: Aug. 28, 1984

[54] WAVE GUIDE LASER WITH FRUSTRATION ELEMENT

[76] Inventors: Heinrich Karning, Alb.-Fritz-Str. 6, 6900 Heidelberg; Franz Prein, Tulpenweg 3, 6901 Waldhilsbach, both of Fed. Rep. of Germany

[21] Appl. No.: 329,268

[22] PCT Filed: Jan. 24, 1981

[86] PCT No.: PCT/DE81/00020
§ 371 Date: Dec. 4, 1981
§ 102(e) Date: Dec. 4, 1981

[87] PCT Pub. No.: WO81/02953
PCT Pub. Date: Oct. 15, 1981

[30] Foreign Application Priority Data

Apr. 5, 1980 [DE] Fed. Rep. of Germany ....... 3013302

[51] Int. Cl.³ .............................................. H01S 3/10
[52] U.S. Cl. ..................................... 372/108; 372/26; 372/93; 372/94
[58] Field of Search .................... 372/108, 100, 94, 26, 372/93, 64

[56] References Cited

U.S. PATENT DOCUMENTS 3,500,240 3/1970 Kessler ................................ 372/108

FOREIGN PATENT DOCUMENTS 1006804 10/1965 United Kingdom ................ 372/108

OTHER PUBLICATIONS

Bergstein et al., "A Total-Reflection Solid-State Optical-Maser Resonator", *Proc. IRE*, vol. 50, Aug. 1962, p. 1833.

*Primary Examiner*—James W. Davie
*Attorney, Agent, or Firm*—Anthony H. Handal

[57] ABSTRACT

On one side of a waveguide laser (1), the cavity is terminated by two totally reflecting optical elements or by one totally reflecting element and one (partially) reflecting element (6; 7). The other side of the laser faces the long side (10") of a prism (10), in contact or with spacing, serving to fold the beam. A further prism (11) cooperates with one of the short sides (10') of the prism (10) cooperate to form a variable gap to influence the oscillation of the laser beam. If both of the optical elements (6; 7) are totally reflecting, the beam may be extracted from the cavity at this point. The function of the two prisms is that of a Q-switch with short operating times, which can also be designated as a frustration element.

11 Claims, 2 Drawing Figures

WAVE GUIDE LASER WITH FRUSTRATION ELEMENT

The invention relates to a laser system consisting substantially of a folded beam path located in an amplifying medium and terminated by at least partially transmitting and/or totally reflecting optical elements. A system of this type is treated in detail, for example, in the German Offenlegungsschrift No. 27 53 304, which is hereby incorporated by reference.

The object of the invention is considered to be the provision of a Q-switch that operates abruptly, i.e. with very short time constants, and which can be used to modulate the laser beam. This object is attained, according to the invention, in that the folding of the beam and any necessary coupling out of the beam is performed by a frustration element consisting of two deviating elements made of optically refracting material, e.g., two prisms, which face each other across a variable gap. A laser of this type may be constructed with commercially available parts so that, from the viewpoint of both manufacture and function, relatively simple elements are available to influence the laser beam in such a way that its resonator preferably does not oscillate. In connection with the foregoing, it is suitable that the variable gap is defined between the oblique side of the larger prism and the long side of the smaller prism and further that the long side of the larger prism faces the endface of the laser that lies opposite the optical elements, with or without spacing.

The variation of the gap between the two ridge prisms may be obtained with the aid of piezo-electric drive means. If desired, the beam may be extracted from the cavity via the side of the frustration element defining the width of the gap, depending on whether only one of the ends of the beam path is terminated by a totally reflecting mirror and the other by an at least partially transmitting window, or, on the other hand, both ends are terminated by totally reflecting elements. In the latter case, the resonator oscillates until the pulse has built up and the gap is closed, whereafter the beam leaves the cavity at right angles to the long axis thereof, or, in the other case, through the window.

An advantageous further development of the invention provides for the use of the proposed apparatus in gas lasers, semiconductor lasers or solid state lasers. For gas lasers, it may be advantageous if the beam passages and the folding region in the frustration element are integral with a block of material, in the form of a continuous channel. In that case, excitation and discharge take place via electrodes or series of electrodes entering the channel on opposite sides thereof. Many materials can be used; they must have electrically insulating properties, so that for example, glass, ceramics, glass-ceramic compositions, quartz or plastic are usable in principle. The gas channels in the material have diameters in the millimeter range.

Two exemplary embodiments of the invention will be explained in detail with the aid of the drawing, the two figures of which exhibit the same reference characters for similar elements.

Figure 2:
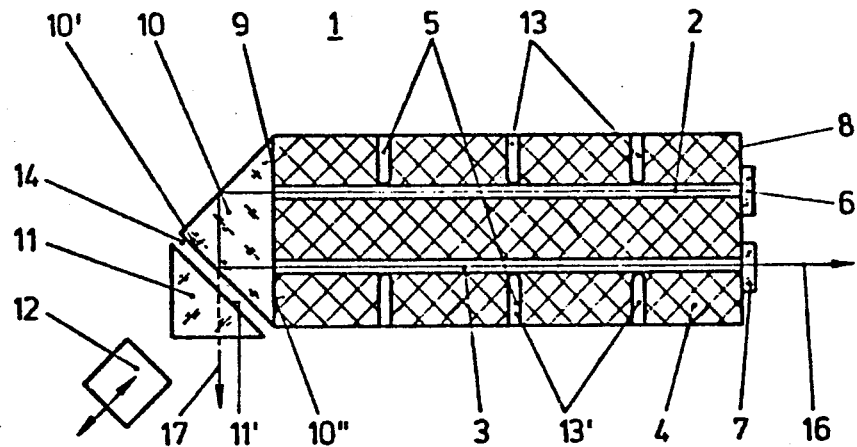

FIG. 1 is an illustration of the apparatus of the invention wherein the beam may be disposed in any suitable laser medium; and FIG. 2 is an illustration of the apparatus of the invention when used for a gas laser.

In FIG. 1, two mutually parallel beam paths 2 and 3 of a laser 1 are shown to be disposed in any suitable medium, for example, a solid state medium. On one side 8, the upper channel 2, as seen in the figure, is terminated by a totally reflecting optical element 6, for example, a mirror, while the channel 3 is terminated by a transmitting element 7, i.e., a window, for extracting the beam out of the cavity, indicated schematically by the solid-line arrow 16. The other endface 9 of the laser faces a deviating element 10 made of an optically refracting material, in particular, the long side 10'' of, for example, a ridge prism, across a separating space. The deviating element deviates the laser beam by 2×90° from one discharge channel into the other. However, the prism may also be in contact with the endface of the laser as shown, for example, in FIG. 2. Its oblique side 10' faces, across a small gap, the long side 11' of a further ridge prism 11, the length of the side 11' being made equal to the length of the oblique side 10'. The ridge prism 11 may be displaced in the directions of the double arrow by means of a piezo-electric drive 12, thereby changing the width of the gap and hence affecting the oscillation of the laser beam. A system of prisms with a variable gap is also described as a frustration element.

In another embodiment of the invention, the at least partially transmissive mirror 7 may be replaced by a totally reflecting mirror. In that case, the beam is extracted from the cavity at the other side, i.e., across the face 10' of the frustration element, which is reflecting when the element is open, and departs in the direction of the dashed arrow 17. The angle the departing beam makes with the axis of the cavity need not be 90° but depends on the material being used and is, for example, 106° for quartz.

In yet another embodiment of the invention, the optical element 7 may have a transmission factor of only 70% or thereabout. In that case, time-shifted pulses may be coupled out along both arrows.

FIG. 2 illustrates an embodiment especially suited to the requirements of gas lasers, also having two mutually parallel channels 2 and 3, disposed in the direction of the longitudinal axis. Their diameters lie in the millimeter range and they are either cast into the compact block of material 4 or may be bored into such a block after casting. Passages or recesses 5, perpendicular to the channels, extend toward the outside and are produced in the material in the same way as the channels themselves. They serve to receive two opposing rows of electrodes, in the present example sets of three electrodes 13 and 13'.

We claim:

1. In a modulated laser system comprising a first waveguide having first and second endfaces, a frustration element, and a first and second optical element, wherein, said first optical element is totally reflecting; a first beam path traverses said first waveguide; said first waveguide is defined adjacent said first endface by said first optical element and is defined adjacent said second endface by said frustration element; and said frustration element comprises first and second optically refracting parts movably positioned adjacent to each other with a gap of variable width between said first and second refracting parts, and transducer means for supporting said first and second parts in physical positions with respect to each other in response to modulation information, said first part being configured and dimensioned to fold a beam exiting along said first beam path by internal reflection in said first path onto said second optical element if said first and second parts are not in contact and said beam is coupled out by said second part if said first and second parts are in contact.

2. A laser system according to claim 1 wherein said second optical element is at least partially transmitting.

3. A laser system according to claim 2 wherein said folded beam traverses a second waveguide and defines a second beam path, said second beam path being parallel to said first beam path, and said second waveguide is terminated at a first endface by said second optical element and at a second endface by said frustration element.

4. A laser system according to claim 1, wherein said first part is a larger prism and said second part is a smaller prism, and said gap of variable width is formed by an oblique side of said larger prism and the long side of said smaller prism.

5. A laser system according to claim 4, wherein said frustration element is so disposed that the long side of said larger prism confronts said second endface.

6. A laser system according to claim 1, wherein said transducer means is a piezoelectric device.

7. A laser system according to claim 1, wherein said second optical element is at least partially transmitting and said beam is extracted at said second optical element.

8. A laser system according to claim 1, wherein said second optical element has a transmission factor of about 70%, and said beam is extracted at said second optical element and said frustration element in the form of time-shifted pulses.

9. A laser system according to claim 1, wherein said system comprises a gas laser.

10. A laser system according to claim 3, wherein said first and second beam paths are defined by channels, and said first and second waveguides comprise a solid block of material.

11. A laser system according to claim 10, wherein excitation and discharge of said laser take place via electrodes extending into said channels from opposite sides of said block.

* * * * *